United States Patent
Salwan et al.

(10) Patent No.: US 7,215,264 B2
(45) Date of Patent: May 8, 2007

(54) METHODS AND SYSTEMS FOR CHARACTER CONVERSION

(75) Inventors: Vikram Salwan, Noida (IN); Arun Gupta, Noida (IN); Anku Jain, Noida (IN)

(73) Assignee: Pixtel Media Technology (P)Ltd., Noida (IN)

( * ) Notice: Subject to any disclaimer, the term of this patent is extended or adjusted under 35 U.S.C. 154(b) by 0 days.

(21) Appl. No.: 11/242,421

(22) Filed: Sep. 30, 2005

(65) Prior Publication Data

US 2007/0075879 A1    Apr. 5, 2007

(51) Int. Cl.
    *H03M 7/00*    (2006.01)
(52) U.S. Cl. .................. 341/106; 341/84; 341/85; 341/62
(58) Field of Classification Search ............ 341/51, 341/62, 90, 106, 107; 345/467, 551; 382/180, 382/292
    See application file for complete search history.

(56) References Cited

U.S. PATENT DOCUMENTS

| | | | | |
|---|---|---|---|---|
| 5,784,069 A | * | 7/1998 | Daniels et al. | 345/467 |
| 5,784,071 A | * | 7/1998 | Tang et al. | 345/467 |
| 5,793,381 A | * | 8/1998 | Edberg et al. | 345/467 |
| 5,881,168 A | * | 3/1999 | Takaoka et al. | 382/180 |
| 6,373,409 B1 | * | 4/2002 | Smith et al. | 341/60 |
| 6,400,287 B1 | * | 6/2002 | Ehrman | 341/55 |
| 6,668,085 B1 | * | 12/2003 | Evans | 382/229 |
| 6,701,320 B1 | | 3/2004 | Marple | |
| 6,738,042 B1 | | 5/2004 | Nobukiyo | |
| 6,822,586 B2 | * | 11/2004 | Esbensen | 341/50 |
| 6,999,082 B2 | * | 2/2006 | Nishimura | 345/467 |
| 2001/0029542 A1 | * | 10/2001 | Nishimura | 709/231 |
| 2003/0009653 A1 | * | 1/2003 | Esbensen | 712/220 |
| 2005/0015524 A1 | * | 1/2005 | Yamada | 710/62 |
| 2006/0132336 A1 | * | 6/2006 | Chen et al. | 341/62 |

* cited by examiner

*Primary Examiner*—Linh V. Nguyen
(74) *Attorney, Agent, or Firm*—Thomas, Kayden, Horstemeyer & Risley

(57) ABSTRACT

Character conversion methods for converting characters from a source character code set to a destination character code set. The source and destination character code sets are analyzed to establish a mapping table indicating relationships therebetween. A target character encoded in the source character code set is converted to destination code encoded in the destination character code set by searching the mapping table.

15 Claims, 3 Drawing Sheets

METHODS AND SYSTEMS FOR CHARACTER CONVERSION

BACKGROUND

This present invention relates to character conversion technology, and in particular to a method for converting character codes between two different character code sets.

Character encoding/decoding is mainly utilized in multilingual applications. The multilingual applications may be employed in many devices, such as computers, Personal Digital Assistants (PDAs), or mobile handheld devices.

A conventional method of converting character codes between two different character code sets is to establish one-to-one mapping tables. The established mapping tables generally contain records of character codes of two different character code sets, that is, a source character code set and a destination character code set.

For example, if a source character code set is Arabic ISO and a destination character code set is Unicode-UCS (Universal Character Set), a one-to-one mapping table is established for character code conversion. In this example, because Arabic ISO (International Organization for Standardization) character set includes 209 characters and Arabic ISO/Unicode-UCS uses 16 bit (2 bytes) representation, a one-way mapping table requires (209)×(2+2)=836 bytes. A one-way mapping table can only accomplish one-way conversion, that is, from Arabic ISO to Unicode or from Unicode to Arabic ISO. If two-way conversion is required, that is, from Arabic ISO to Unicode and from Unicode to Arabic ISO, the size of the mapping table must be doubled to 836×2=1672 bytes.

Furthermore, the efficiency of character conversion can be viewed as the efficiency of a binary search in the mapping table. The complexity is $\log_2 N$, N=209.

Since different languages may adopt different character code sets to encode characters, in the device supporting multilingual applications, characters have to be converted from one character code set to another, causing character conversion problems. Particularly, in some devices, such as mobile handhelds, the memory size and the calculation ability of central processing unit (CPU) may be limited. Thus, conventional methods are not satisfactory for many devices.

SUMMARY

Character conversion methods from a source character code set to a destination character code set are disclosed. A mapping table indicating the relationships between the source and destination character code sets is provided. The mapping table is established based on discontinuous ranges of the source character code sets. A source code of a target character encoded in the source character code set is received. The mapping table is searched to acquire a start value and an offset according to the source code. The offset indicates a corresponding value to the start value in the destination character code set. A difference is then calculated according to the start value and the source code. The offset is added to the difference to acquire a destination value.

DESCRIPTION OF THE DRAWINGS

The invention can be more fully understood by reading the subsequent detailed description and examples with references made to the accompanying drawings, wherein.

DESCRIPTION

Figure 1:
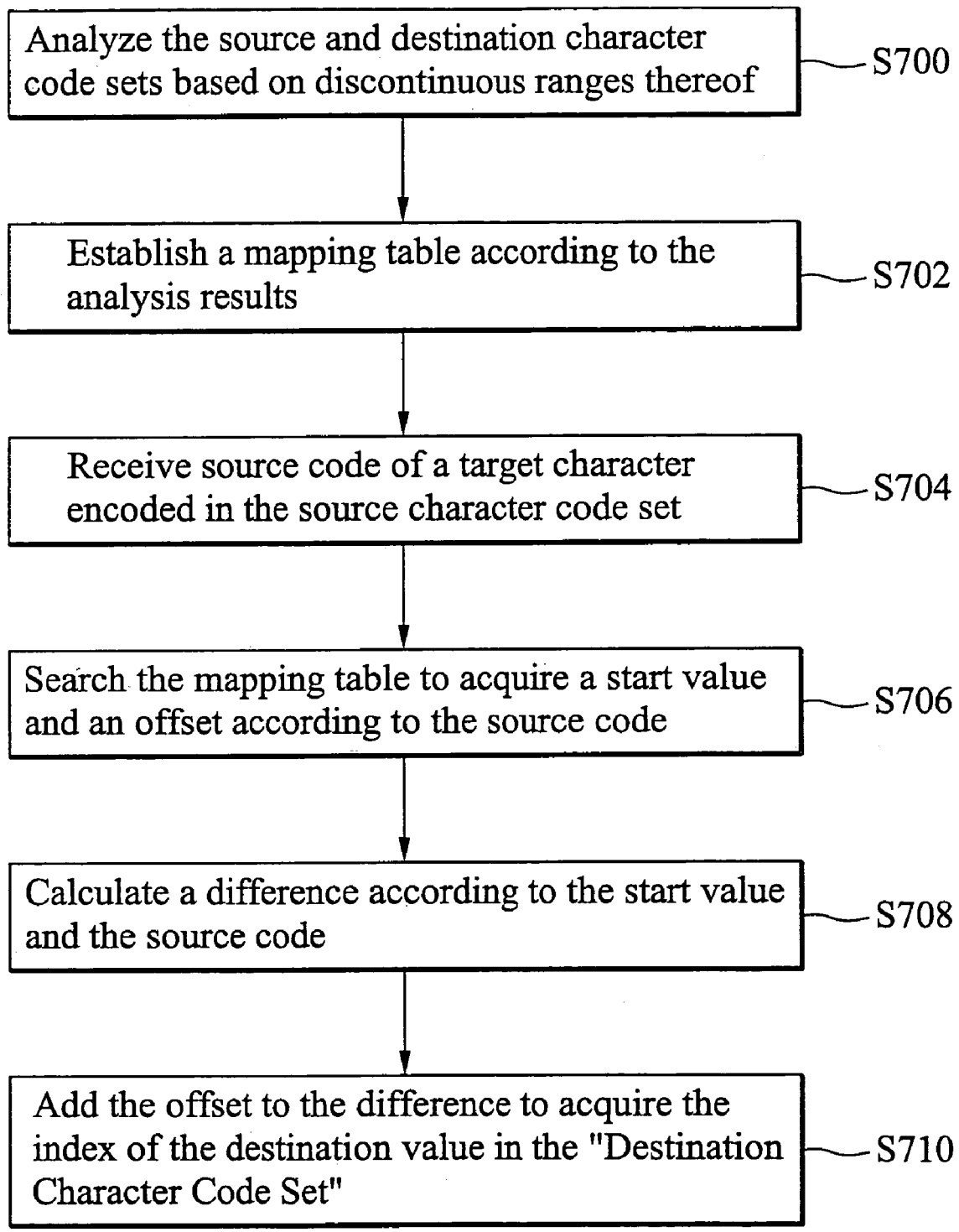
FIG. 1 is a flowchart of an embodiment of a character conversion method.

FIG. 1 is a flowchart of an embodiment of a character conversion method capable of being applied in a mobile handheld device. Source and destination character code sets are first analyzed based on discontinuous ranges of the source and destination character code sets (step S700).

A mapping table is established according to the analysis results (step S702). Thus, the mapping table indicates the relationships between the source and destination character code sets based on discontinuous ranges thereof. The mapping table has several entries for representing discontinuous ranges in the source character code set.

A source code of a target character encoded in the source character code set is received (step S704). The mapping table is searched to acquire a start value and an offset according to the source code (step S706). The offset indicates a value corresponding to the start value in the destination character code set. The search can be implemented by a binary search. A difference is then calculated according to the start value and the source code (step S708). The calculation of the difference can be accomplished by using the source code minus the start value.

The offset is added to the difference to acquire a destination value (step S710). The destination value is an index of character code of the target character in the destination character code set. Thereafter, character code of the target character encoded in the destination character code set can be acquired according to the index.

Figure 2:
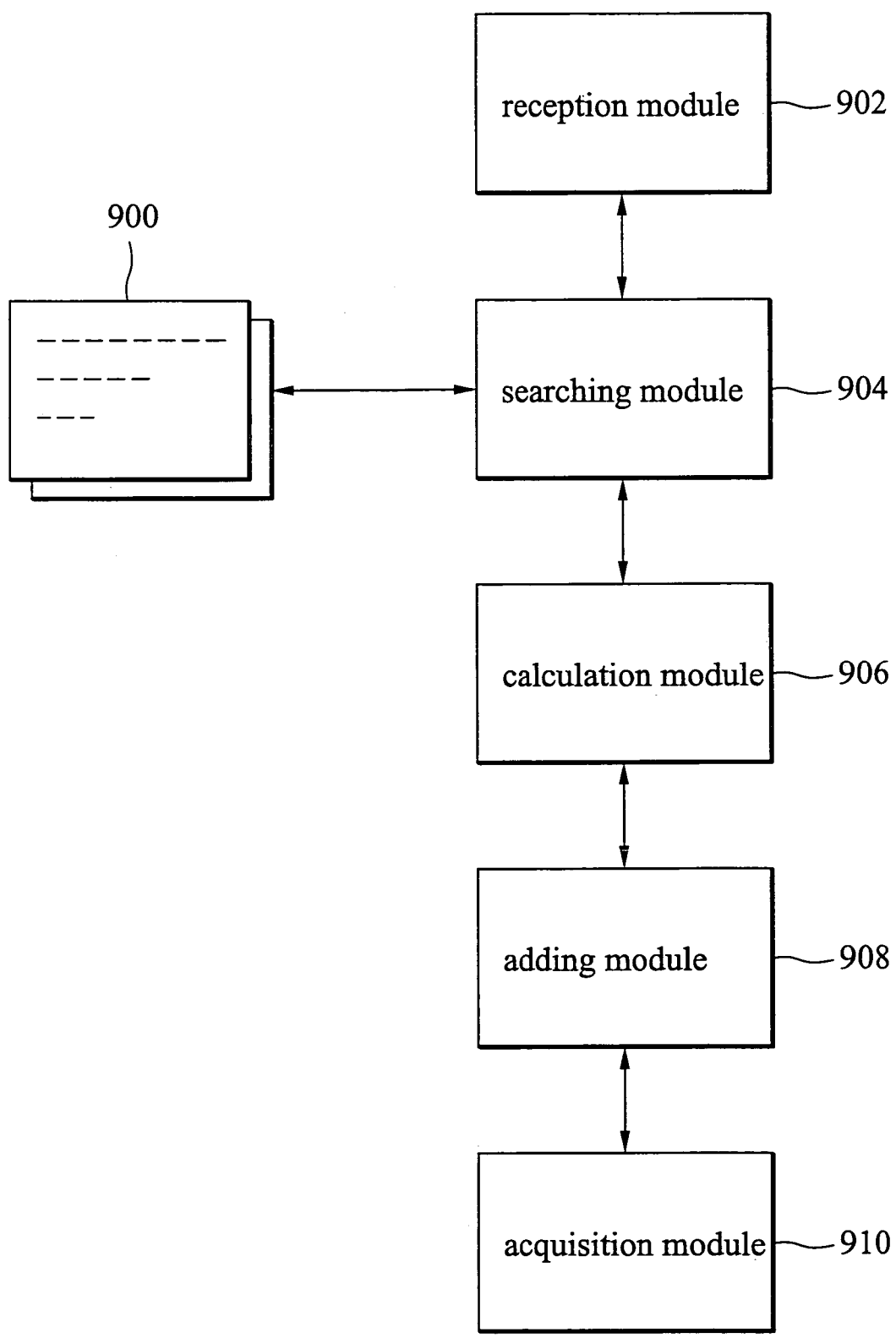
FIG. 2 is a diagram of an embodiment of a character conversion system.

FIG. 2 is a diagram of an embodiment of a character conversion system capable of being applied in a mobile handheld device. A character conversion system, converting characters from a source character code set to a destination character code set, comprises a mapping table 900, a reception module 902, a searching module 904, a calculation module 906, and an adding module 908.

The mapping table 900 indicates the relationships between the source and destination character code sets based on discontinuous ranges of the source and destination character code sets. The mapping table is established by analyzing the source and destination character sets. The mapping table 900 comprises several entries for representing discontinuous ranges of the source character code set.

The reception module 902 receives a source code of a target character encoded in the source character code set. The searching module 904 searches the mapping table to acquire a start value and an offset according to the source code. The offset indicates a value corresponding to the start value in the destination character code set. The searching module 904 conducts a binary search of the mapping table.

The calculation module 906 calculates a difference according to the start value and the source code. The calculation module 906 calculates the difference using the source code minus the start value. An adding module 908 adds the offset to the difference to acquire a destination value. The destination value is an index of character code of the target character in the destination character code set. The character conversion system may further comprise an acquisition module 910 to acquire character code of the target character encoded in the destination character code set according to the index.

Figure 3:
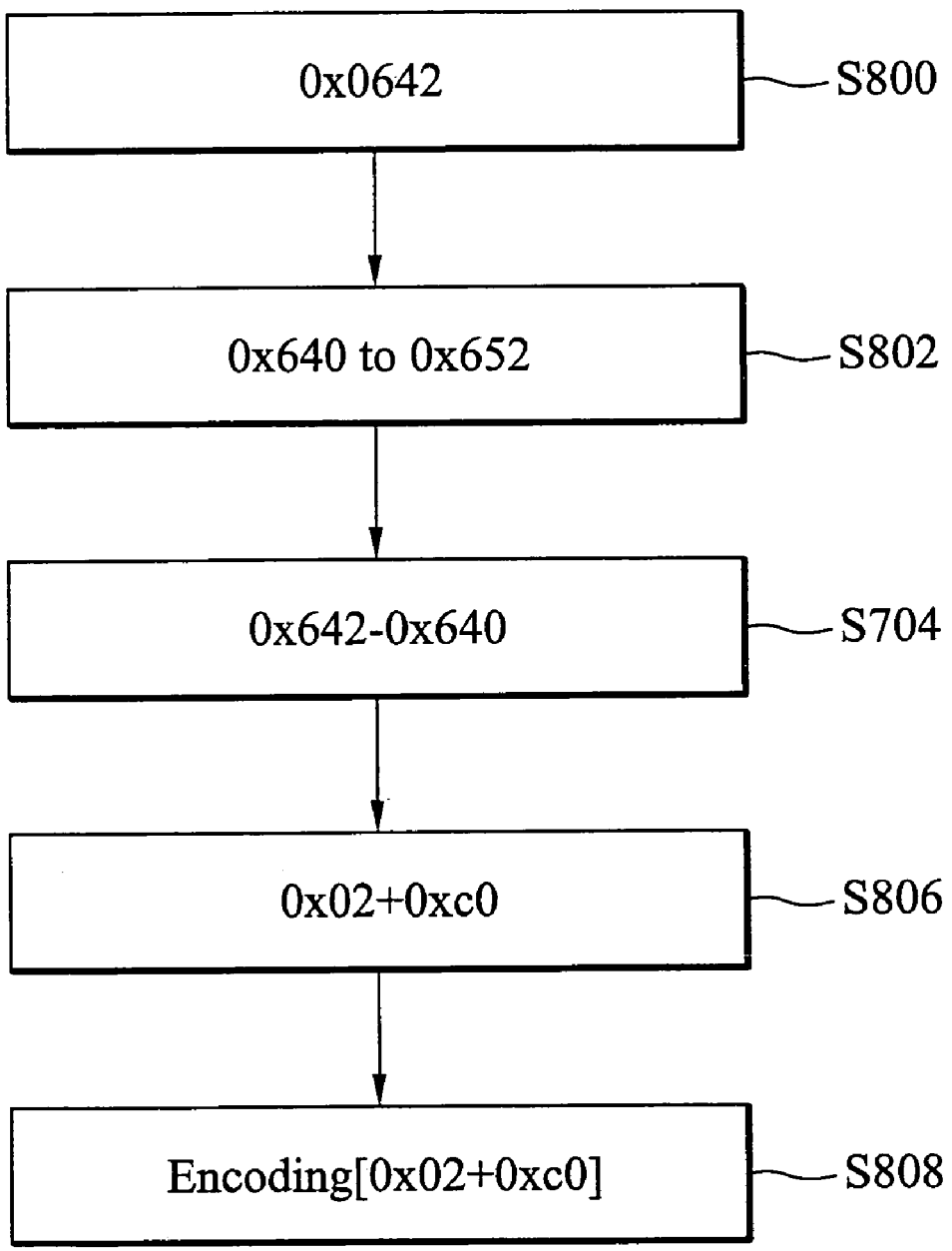
FIG. 3 is a flowchart of exemplary character conversion according to the character conversion method.

FIG. 3 is a flowchart of an exemplary character conversion according to the character conversion method. In the embodiment, the source character code set is UCS and the destination character code set is Arabic ISO. A target character "ق" is converted from UCS to Arabic ISO. The target character "ق38 is encoded as "0x642" in UCS and as "0xe2" in Arabic ISO.

UCS and Arabic ISO character code sets are first analyzed based on discontinuous ranges thereof. A mapping table is established according to the analysis results. Table 1 is the mapping table established according to the analysis results. Here, Table 1 has eight entries representing eight discontinuous ranges of the source character code set, i.e. UCS. Table 1 indicates corresponding relationships between UCS and Arabic ISO character code sets. Each of the entries in Table 1 comprises a start value, an end value and an offset. As indicated by the first entry, the first character code range in UCS is from 0x0000 (the start value of the first range) to 0x00a0 (the end value of the first range), and a corresponding first character code range in Arabic ISO is starting with 0x0, which is the offset. Similarly, the second character code range in UCS is from 0x00a4 (the start value of the second range) to 0x00a4 (the end value of the second range), and a corresponding second character code range in Arabic ISO is starting with 0xa1, which is the offset. As shown in Table 1, the ranges are discontinuous, and are sorted in ascending order.

TABLE 1

| Start Value | End Value | Offset |
| --- | --- | --- |
| 0 × 0000 | 0 × 00a0 | 0 × 0 |
| 0 × 00a4 | 0 × 00a4 | 0 × a1 |
| 0 × 00ad | 0 × 00ad | 0 × a2 |
| 0 × 060c | 0 × 060c | 0 × a3 |
| 0 × 061b | 0 × 061b | 0 × a4 |
| 0 × 061f | 0 × 061f | 0 × a5 |
| 0 × 0621 | 0 × 063a | 0 × a6 |
| 0 × 0640 | 0 × 0652 | 0 × c0 |

As shown in FIG. 3, a source code "0x0642" of the target character "ق" encoded in UCS is received (step S800). Table 1 is searched to acquire a start value and an offset according to the source code. "0x0642" (step S802). Since the source code "0x0642" is located in the range from "0x0640" to "0x0652," the eighth entry is searched to obtain the start value "0x0640" and the offset "0xc0". A difference is then calculated according to the start value "0x0640" and the source code "0x0642" (step S804). The difference is equal to the source code "0x0642" minus the start value "0x0640". The difference is "0x02". The offset "0xc0" is then added to the difference "0x02" to acquire a destination value (step S806). The destination value is an index of character code of the target character in the destination character code set. Thereafter, character code of the target character encoded in the destination character code set, i.e. Arabic ISO, can be acquired according to the index (step S808).

Table 1 is a one-way mapping table only capable of accomplishing one-way conversion, that is, from Unicode-UCS to Arabic ISO. If two-way conversion is required, that is, from Unicode-UCS to Arabic ISO and from Arabic ISO to Unicode-UCS, another table, i.e. Table 2, for one-way conversion of from Arabic ISO to Unicode-UCS is also needed. That is, in the one-way conversion of from Arabic ISO to Unicode-UCS, the source character code set is Arabic ISO and the destination character code set is UCS.

Similarly, Table 2 has seven entries for representing seven discontinuous ranges of the source character code set, i.e. Arabic ISO. Table 2 indicates corresponding relationships between Arabic ISO and UCS character code sets. Each of the entries in Table 2 comprises a start value, an end value and an offset. As indicated by the first entry, the first character code range in Arabic ISO is from 0x0 (the start value of the first range) to 0xa0 (the end value of the first range), and a corresponding first character code range in UCS is starting with 0x0, which is the offset. Similarly, the second character code range in Arabic ISO is from 0xa4 (the start value of the second range) to 0xa4 (the end value of the second range), and a corresponding second character code range in UCS is starting with 0xa1, which is the offset. As shown in Table 2, the ranges are discontinuous, and are sorted in ascending order.

TABLE 2

| Start Value | End Value | Offset |
| --- | --- | --- |
| 0 × 0 | 0 × a0 | 0 × 0 |
| 0 × a4 | 0 × a4 | 0 × a1 |
| 0 × ac | 0 × ad | 0 × a2 |
| 0 × bb | 0 × bb | 0 × a4 |
| 0 × bf | 0 × bf | 0 × a5 |
| 0 × c1 | 0 × da | 0 × a6 |
| 0 × e0 | 0 × f2 | 0 × c0 |

Total table size for two way character conversion, from Unicode-UCS to Arabic ISO and from Arabic ISO to Unicode-UCS, is the sum of the mapping tables, i.e. Table 1 and Table 2. The size depends on the number of discontinuous ranges of character codes in character code sets of Unicode-UCS and Arabic ISO. Here, Table 1 contains 8 entries for 8 ranges, and each entry requires 6 bytes for storing values, start value, end value and offset, each of them requiring 2 bytes. Therefore, the size of Table 1 is 8×6=42 bytes. Table 2 contains 7 entries for 7 ranges, and each entry requires 6 bytes for storing values. Therefore, the size of Table 2 is 7×6=48 bytes. Thus, the total table size for two way character conversion, from Unicode-UCS to Arabic ISO and from Arabic ISO to Unicode-UCS, is 8×6+7×6=42+48=90 bytes. If the encoding tables for character code sets of Unicode-UCS and Arabic ISO are considered, the total memory size is 42+48+(209×2×2)=926 bytes. Compared to the requirements of conventional methods of 1672 bytes, memory requirements have been reduced to almost half according to the inventive method.

Furthermore, the provided methods increase efficiency by reducing search candidates. Here, the complexity is '$\log_2 8$' for conversion from UCS to Arabic ISO and '$\log_2 7$' for conversion from Arabic ISO to UCS.

Thus, provided character conversion methods and systems resolve conventional character conversion problems and increase data processing efficiency for mobile devices.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A character conversion method for converting characters from a source character code set to a destination character code set, comprising:

analyzing the source character code set and the destination character code set;

providing a mapping table according to the result of the analysis, indicating relationships between the source and destination character code sets, wherein the mapping table is established based on discontinuous character code ranges of the source character code set and the destination character code set;

receiving a source code of a target character encoded in the source character code set;

searching the mapping table according to the source code to acquire a corresponding value; and calculating a destination value according to the corresponding value.

2. The character conversion method as claimed in claim 1, wherein the destination value is an index of character code of the target character in the destination character code set, and the method further acquires character code of the target character encoded in the destination character code set according to the index.

3. The character conversion method as claimed in claim 1, wherein the mapping table comprises a plurality of entries, wherein each of the entries corresponds to a character code range of the source character code set, and comprises a start value of the corresponding range, an end value of the corresponding range, and an offset indicating a value in the destination character code set corresponding to the start value.

4. The character conversion method as claimed in claim 3, wherein the step of searching the mapping table according to the source code comprises:

searching the mapping table using a binary search to obtain a start value and an offset.

5. The character conversion method as claimed in claim 4, wherein the step of calculating the destination value according to the corresponding value comprises:

calculating a difference according to the start value and the source code; and adding the offset to the difference to acquire the destination value.

6. A character conversion system for converting characters from a source character code set to a destination character code set, comprising:

a mapping table indicating relationships between the source and destination character code sets, wherein the mapping table is established based on discontinuous character code ranges in the source character code set and the destination character code set;

a reception module, receiving a source code of a target character encoded in the source character code set;

a searching module, coupled to the reception module, searching the mapping table to acquire a start value and an offset according to the source code, wherein the offset indicates a value in the destination character code set corresponding to the start value;

a calculation module, coupled to the searching module, calculating a difference according to the start value and the source code; and an adding module, coupled to the calculation module, adding the offset to the difference to acquire a destination value.

7. The character conversion system as claimed in claim 6, wherein the destination value is an index of character code of the target character in the destination character code set, wherein the character conversion system further comprises an acquisition module, coupled to the adding module, acquiring character code of the target character encoded in the destination character code set according to the index.

8. The character conversion system as claimed in claim 6, wherein the searching module utilizes a binary search to search the mapping table.

9. The character conversion system as claimed in claim 6, wherein the mapping table comprises a plurality of entries, wherein each of the entries corresponds to a character code range of the source character code set, and comprises a start value of the corresponding range, an end value of the corresponding range, and an offset indicating a value in the destination character code set corresponding to the start value.

10. The character conversion system as claimed in claim 6, wherein the calculation module performs the calculation of the difference by the source code minus the start value.

11. A character conversion method for converting characters from a source character code set to a destination character code set, comprising:

providing a mapping table, indicating relationships between the source and destination character code sets, wherein the mapping table is established based on discontinuous character code ranges of the source character code set and the destination character code set;

receiving a source code of a target character encoded in the source character code set;

searching the mapping table to acquire a start value and an offset according to the source code, wherein the offset indicates a value in the destination character code set corresponding to the start value;

calculating a difference according to the start value and the source code; and adding the offset to the difference to acquire a destination value.

12. The character conversion method as claimed in claim 11, wherein the destination value is an index of character code of the target character in the destination character code set, and the method further acquires character code of the target character encoded in the destination character code set according to the index.

13. The character conversion method as claimed in claim 11, wherein the mapping table is searched by a binary search.

14. The character conversion method as claimed in claim 11, wherein the mapping table comprises a plurality of entries, wherein each of the entries corresponds to a character code range of the source character code set, and comprises a start value of the corresponding range, an end value of the corresponding range, and an offset indicating an index value corresponding to the start value.

15. The character conversion method as claimed in claim 11, wherein calculation of the difference is accomplished by the source code minus the start value.

* * * * *